S. BRYAN.
STREET CAR TROLLEY POLE WHEEL.
APPLICATION FILED JUNE 20, 1907.
913,615.
Patented Feb. 23, 1909.
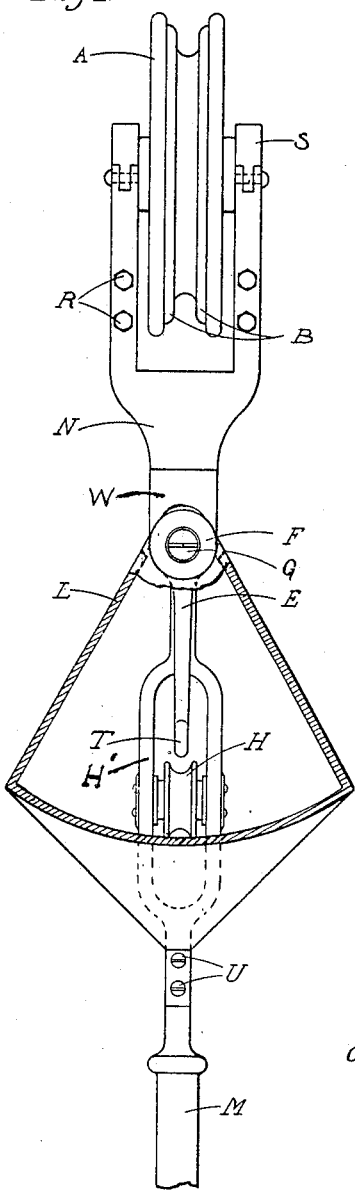
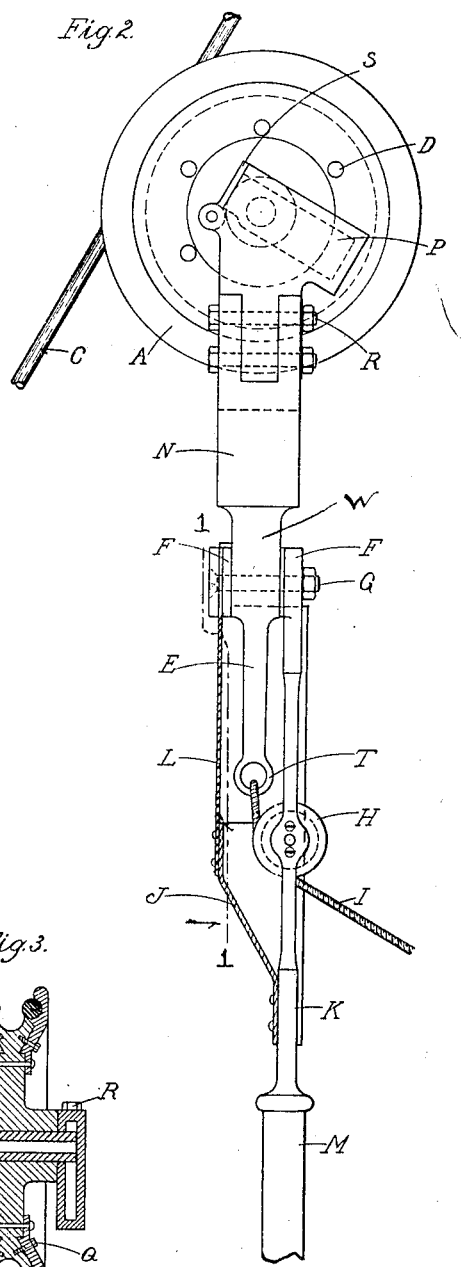
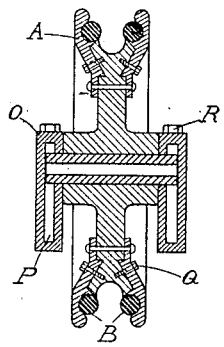
WITNESSES
INVENTOR
SOLON BRYAN.
BY J. Clyde Hizar.
ATTORNEY

UNITED STATES PATENT OFFICE.

SOLON BRYAN, OF SAN DIEGO, CALIFORNIA.

STREET-CAR TROLLEY-POLE WHEEL.

No. 913,615.      Specification of Letters Patent.      Patented Feb. 23, 1909.

Application filed June 20, 1907. Serial No. 379,992.

*To all whom it may concern:*

Be it known that I, SOLON BRYAN, a citizen of the United States, residing at San Diego, in the county of San Diego and State of California, have invented a new and useful Street-Car Trolley-Pole Wheel, of which the following is a specification.

My invention relates to trolley pole wheels for street car services and other motor car appliances. It is so constructed as to enable it to follow the line, practically and automatically adjust itself to meet the requirements of curves and turns in the car lines, and at all times is so arranged that it runs square with the line. This appliance is free from any spring or other binding objects that might cause it to press on either side of the line, and thereby cause it to run off.

Another object is to provide means for breaking the current and preventing the wire from leaving the wheel when the said wire sheers in said wheel.

I attain these objects by the mechanism illustrated in the accompanying drawings, in which,—

Figure 1, is a top elevation of the entire wheel and connections; Fig. 2 is a side elevation showing the rope passing through the pulley which draws the wheel in line with the pole when desired to be shifted from one line to the other or placed back on the line; Fig. 3 is a sectional view of the wheel complete showing the method of construction of the insulated rim that passes around each side of the wheel on the inside of the groove in which the line travels.

Referring more particularly to the drawing, A designates the trolley wheel which has a bead B of insulating material, such as glass, set into the inner faces of its flanges or rims intermediate of the base of the groove and the edges of said flanges.

In Fig. 2, C indicates the overhead trolley wire or line. It has been found from tests that when the wire sheers in the wheel and begins to climb out of the groove as in going around a curve, it comes in contact with the smooth rounded surface of the beads B which cause said wire to slip back to the bottom of the groove. Said beads also break the current and prevent further sparking which would otherwise take place from friction between the line and the flange of the wheel. This action is of great importance to prevent the wheel from jumping the wire in turning a curve at a high speed. The trolley wheel is preferably formed with apertures D through its web. Said wheel is pivotally mounted in the outer forked end N of an arm W which is pivoted intermediate of its ends to the end of the trolley pole M, as at F, by means of the bolt G. The upper end of said pole near where the arm W is pivoted thereto, is formed into a loop H¹ in which is mounted a pulley H which is thus in alinement with said pole. A fan-shaped casing L is secured to the upper portion of the trolley pole and houses the inner end E of said arm W on three sides while the looped portion of the pole houses said end E on the other side. Said inner end E of the arm W has an eye T at its end to which is secured a flexible connection or rope I passing through the loop H¹ over the pulley H and down to the car for controlling the trolley. By means of this rope the trolley wheel may be brought into line with the pole whenever desired and said pole may be drawn down so as to remove the wheel from the wire.

The trolley wheel is preferably mounted in bearings O having separate oil cups P on each side secured to the arm W by bolts R. Said oil cups are extended downwardly to a considerable extent to provide storage for the oil. The cups are closed by suitable covers such as the hinged closures S shown in Figs. 1 and 2.

The construction of the trolley wheel is such that it is automatic in operation, does not bind or cause friction on the wire, may be applied to the ordinary standard trolley pole now in use without making alterations, and may be easily and quickly removed from the pole. The hinged connection of the wheel with the frame makes said wheel very sensitive in following the line wire accurately under all circumstances.

I claim;

1. The combination, with a trolley pole, of an arm pivoted thereto intermediate of its ends and adapted to swing laterally out of the line of said pole, a wheel mounted on the outer end of said arm, a casing housing the inner end of said arm on three sides, and means connected with said inner end of said arm for bringing said arm into line with the pole when desired.

2. The combination, with a trolley pole, of an arm pivoted thereto intermediate of its ends and adapted to swing laterally out of the line of said pole, a trolley wheel mounted on the outer end of said arm, flexible connection from the inner end of said arm for bringing said arm into line with the pole when desired, and a guide wheel for said flexible connection mounted on said pole in alinement therewith.

3. The combination, with a trolley pole, of an arm pivoted thereto intermediate of its ends and adapted to swing laterally out of the line of said pole, a trolley wheel mounted on the outer end of said arm, flexible connection from the inner end of said arm for bringing said arm into line with the pole when desired, and a guide wheel for said flexible connection mounted in a loop formed in the trolley pole.

4. The combination, with a trolley pole, of an arm pivoted thereto intermediate of its ends and adapted to swing laterally out of the line of said pole, a trolley wheel mounted on the outer end of said arm, flexible connection from the inner end of said arm for bringing said arm into line with the pole when desired, a guide wheel for said flexible connection mounted on said pole in alinement therewith, and a casing housing the inner end of said arm on three sides.

5. The combination, with a trolley pole, of an arm pivoted thereto intermediate of its ends and adapted to swing laterally out of the line of said pole, a trolley wheel mounted on the outer end of said arm, flexible connection from the inner end of said arm for bringing said arm into line with the pole when desired, a guide wheel for said flexible connection mounted in a loop formed in the trolley pole, and a casing housing the inner end of said arm on three sides while said looped portion of the pole houses it on the other side.

6. A trolley wheel having smooth rounded beads of hard insulation projecting from the inner faces of the flanges forming the wire engaging groove for the purpose specified.

7. A trolley wheel having smooth rounded beads of hard insulation projecting from the inner faces of the flanges forming the wire engaging groove and intermediate of the base of said groove and the edges of said flanges for the purpose specified.

In testimony whereof I have affixed my signature in the presence of two witnesses.

SOLON BRYAN.

Witnesses:
  J. W. MASHER,
  JULIA M. HILB.